United States Patent
De Mondt et al.

(10) Patent No.: US 11,400,701 B2
(45) Date of Patent: *Aug. 2, 2022

(54) MANUFACTURING OF DECORATIVE SURFACES BY INKJET

(71) Applicants: AGFA NV, Mortsel (BE); Unilin BvbA, Wielsbeke (BE)

(72) Inventors: Roel De Mondt, Mortsel (BE); Rita Torfs, Mortsel (BE)

(73) Assignees: AGFA NV, Mortsel (BE); Unilin BVBA, Wielsbeke (BE)

( * ) Notice: Subject to any disclaimer, the term of this patent is extended or adjusted under 35 U.S.C. 154(b) by 503 days.

This patent is subject to a terminal disclaimer.

(21) Appl. No.: 14/914,032

(22) PCT Filed: Oct. 10, 2014

(86) PCT No.: PCT/EP2014/071733
§ 371 (c)(1),
(2) Date: Feb. 24, 2016

(87) PCT Pub. No.: WO2015/058974
PCT Pub. Date: Apr. 30, 2015

(65) Prior Publication Data
US 2016/0207307 A1    Jul. 21, 2016

(30) Foreign Application Priority Data
Oct. 22, 2013   (EP) ..................... 13189667

(51) Int. Cl.
*B41J 2/01* (2006.01)
*B32B 38/00* (2006.01)
(Continued)

(52) U.S. Cl.
CPC ................. *B41J 2/01* (2013.01); *B32B 37/10* (2013.01); *B32B 38/145* (2013.01);
(Continued)

(58) Field of Classification Search
CPC ... B32B 37/10; B41J 2002/012; B41J 2/2107; B41J 2/211
See application file for complete search history.

(56) References Cited

U.S. PATENT DOCUMENTS 3,616,144 A * 10/1971 Kenney .................. B29C 33/30
156/41
3,661,669 A *  5/1972 Cairns ................ A47G 27/0443
156/157
(Continued)

FOREIGN PATENT DOCUMENTS

DE    10 2010 003 437 A1    10/2011
EP        1 044 822 A1     10/2000
(Continued)

OTHER PUBLICATIONS

De Mondt et al.; "Manufacturing of Decorative Surfaces By Inkjet"; U.S. Appl. No. 14/917,042, filed Mar. 7, 2016.
(Continued)

*Primary Examiner* — Matthew J Daniels
*Assistant Examiner* — Andrew D Graham
(74) *Attorney, Agent, or Firm* — Leydig, Voit & Mayer, Ltd.

(57) ABSTRACT

A method of manufacturing a decorative surface includes the steps of a) impregnating a paper substrate with a thermosetting resin; b) jetting a colour pattern with one or more aqueous inkjet inks including a polymer latex binder on the thermosetting resin impregnated paper; c) drying the one or more aqueous inkjet inks; and d) heat pressing the thermosetting paper carrying the colour pattern into a decorative surface.

8 Claims, 1 Drawing Sheet

(51) Int. Cl.
  *B41M 5/00* (2006.01)
  *B41M 5/52* (2006.01)
  *B41J 11/00* (2006.01)
  *E04F 13/08* (2006.01)
  *E04F 15/02* (2006.01)
  *B32B 37/10* (2006.01)
  *E04B 1/61* (2006.01)
  *B41M 7/00* (2006.01)

(52) U.S. Cl.
  CPC ........ *B41J 11/0015* (2013.01); *B41M 5/0011* (2013.01); *B41M 5/5263* (2013.01); *E04B 1/54* (2013.01); *E04B 1/6125* (2013.01); *E04F 13/0871* (2013.01); *E04F 13/0894* (2013.01); *E04F 15/02038* (2013.01); *B32B 2260/028* (2013.01); *B32B 2260/046* (2013.01); *B32B 2419/04* (2013.01); *B32B 2479/00* (2013.01); *B32B 2607/00* (2013.01); *B41M 7/0027* (2013.01); *B41M 7/0045* (2013.01); *B41M 7/0054* (2013.01)

(56) References Cited

U.S. PATENT DOCUMENTS

| | | | | | |
|---|---|---|---|---|---|
| 4,112,169 | A | * | 9/1978 | Huffman | B32B 21/06 428/206 |
| 5,380,769 | A | * | 1/1995 | Titterington | B41J 2/0057 347/96 |
| 5,621,022 | A | * | 4/1997 | Jaeger | B41J 11/002 106/31.29 |
| 5,792,398 | A | * | 8/1998 | Andersson | B32B 5/02 264/257 |
| 5,866,638 | A | * | 2/1999 | Shimomura | B41J 2/2107 106/31.46 |
| 6,641,696 | B1 | * | 11/2003 | Edgerton | B32B 7/10 156/277 |
| 6,656,329 | B1 | * | 12/2003 | Ma | B30B 15/062 204/192.1 |
| 10,022,956 | B2 | * | 7/2018 | De Mondt | E04F 15/02038 |
| 2002/0033862 | A1 | * | 3/2002 | Yoshihira | B41J 2/2107 347/43 |
| 2003/0039810 | A1 | | 2/2003 | Schulz et al. | |
| 2003/0222960 | A1 | * | 12/2003 | Takabayashi | B41J 2/2107 347/102 |
| 2004/0086678 | A1 | * | 5/2004 | Chen | B44C 5/0461 428/44 |
| 2004/0134587 | A1 | * | 7/2004 | Broberg | B32B 27/08 156/60 |
| 2004/0168608 | A1 | * | 9/2004 | Bauer | B41J 2/2107 106/31.27 |
| 2006/0130421 | A1 | * | 6/2006 | Nollet | B44C 5/04 52/582.1 |
| 2007/0104928 | A1 | * | 5/2007 | Yokochi | B32B 27/08 428/204 |
| 2008/0171815 | A1 | * | 7/2008 | Groenendaal | C09D 11/101 524/90 |
| 2008/0192103 | A1 | * | 8/2008 | Daems | B41M 3/008 347/102 |
| 2008/0280055 | A1 | * | 11/2008 | Johan | B41C 1/1066 427/427.4 |
| 2009/0176070 | A1 | * | 7/2009 | Goto | C09D 11/322 428/195.1 |
| 2010/0018438 | A1 | * | 1/2010 | Claes | C09D 11/101 106/31.77 |
| 2010/0026743 | A1 | * | 2/2010 | Van Thillo | B41J 2/175 347/9 |
| 2010/0047454 | A1 | * | 2/2010 | De Voeght | B41J 2/211 427/256 |
| 2010/0087577 | A1 | * | 4/2010 | Didavide | D21H 27/28 524/262 |
| 2010/0271433 | A1 | * | 10/2010 | Jolly | C09D 11/40 347/54 |
| 2011/0159208 | A1 | * | 6/2011 | Price | D21H 17/57 427/557 |
| 2012/0213973 | A1 | * | 8/2012 | Clement | B44C 5/04 428/161 |
| 2013/0065012 | A1 | * | 3/2013 | Parker | B32B 7/12 428/106 |
| 2013/0078437 | A1 | * | 3/2013 | Symkens | B44C 1/00 428/203 |
| 2013/0127961 | A1 | | 5/2013 | Klein et al. | |
| 2013/0208046 | A1 | * | 8/2013 | Guo | C09D 11/40 347/20 |

FOREIGN PATENT DOCUMENTS

| | | |
|---|---|---|
| EP | 1 101 623 A2 | 5/2001 |
| EP | 1 700 689 A1 | 9/2006 |
| EP | 2 431 190 A2 | 3/2012 |
| EP | 2 574 476 A1 | 4/2013 |
| WO | 2013/050910 A1 | 4/2013 |

OTHER PUBLICATIONS

Official Communication issued in International Patent Application No. PCT/EP2014/071733, dated Jan. 7, 2015.

De Mondt et al., "Inkjet Printing Methods for Manufacturing of Decorative Surfaces", U.S. Appl. No. 14/914,033, filed Feb. 24, 2016.

* cited by examiner

MANUFACTURING OF DECORATIVE SURFACES BY INKJET

CROSS-REFERENCE TO RELATED APPLICATIONS

This application is a 371 National Stage Application of PCT/EP2014/071733, filed Oct. 10, 2014. This application claims the benefit of European Application No. 13189667.2, filed Oct. 22, 2013, which is incorporated by reference herein in its entirety.

BACKGROUND OF THE INVENTION

1. Field of the Invention

The present invention relates to the manufacturing of decorative surfaces using inkjet technology.

2. Description of the Related Art

Gravure, offset and flexography are being increasingly replaced for different applications by industrial inkjet printing systems, which have now proven their flexibility in use, such as variable data printing making short production runs and personalized products possible, and their enhanced reliability, allowing incorporation into production lines.

Inkjet technology has also caught the attention of manufacturers of decorative surfaces, such as laminate floor. In the current production process for manufacturing decorative panels as shown by FIG. 1, a paper manufacturer (11) supplies a paper roll (12) to a decor printer (13) who uses gravure printing (14) in order to deliver a decor paper roll (16) to a warehouse (17) of a floor laminate manufacturer (20). Some decor printers (13) are now investigating inkjet printing (15) instead of gravure printing. Rotogravure printing on the porous décor paper generally uses ink having a viscosity at 25° C. of 1 to 2 Pa·s. The viscosity of inkjet inks is much lower, often about 1 to 15 mPa·s at 25° C., which makes it necessary to use a more expensive paper having a special ink-receiving layer in order to obtain a good image quality. The floor laminate manufacturer (20) stores the decor paper rolls (16) having different decorative patterns in his warehouse (17). Depending on the market demand, the floor laminate manufacturer (20) then selects the decor rolls (16) with the desired decorative pattern in his warehouse (17). The selected decor rolls (16) are then impregnated (18) and cut to size (19) for manufacturing ready-to-use floor laminate (21). The warehouse (17) is necessary as a buffer for sudden large market demands of a specific floor laminate because there is a large time delay between ordering and delivering of new decorative paper rolls (16).

An approach to reduce the size of the warehouse and time delays is treated by EP 2431190 A (THEODOR HYMMEN), which discloses in FIG. 1 a method for producing a digitally printed sheet, web or plate-shaped workpiece (20) with wear-resistant surface including the steps of: A) providing a digital data set to a digital printing device (1); B) providing a printable workpiece (20) to the printing apparatus (1); C) digital printing at least an acrylate printing ink (22) on the printable workpiece (20) using the printing apparatus (1) and thereafter supplying a resin mixture (5, 21) to the digitally printed workpiece; and D) curing the resin mixture (5, 21) by means of a heated press (7). The time delay can be avoided by the floor laminate manufacturer incorporating the manufacturing of decorative paper rolls into its own production process. EP 2431190 A (THEODOR HYMMEN) discloses in FIG. 2 the use of a paper substrate having a special ink receiving layer (23), which in combination with a more expensive acrylate ink only increases the cost of the final product. Furthermore, paragraph [0003] discloses that the use of acrylate ink leads to adhesion problems between the reactive melamine resin mixture and the acrylate ink, requiring specific measures like crosslinking agents that react only above 50° C. or 70° C., making the manufacturing process less robust.

EP2574476 A (TRESPA) discloses a method for producing a decorative film comprising a resin-impregnated substrate paper provided with one or more top layers, characterised in that the method comprises the following steps: i) providing a resin-impregnated substrate paper; ii) printing the substrate paper obtained in step i) with an ink composition, using inkjet technology; iii) subjecting the substrate paper printed with an ink composition as obtained after step ii) to a treatment of the drying and/or curing type; iv) applying at least one transparent top layer to the paper obtained after step iii); and v) curing the paper obtained after step iv) to obtain the decorative film. EP 1700689 A (DAI NIPPON PRINTING CO) discloses a decorative material comprising a surface layer and a base material layer laminated and integrated on a rear surface thereof, characterized in that the surface layer comprises at least a surface resin layer made of a cured material of an ionizing radiation curing resin, a blocking layer for blocking an ooze out of an uncured material of a thermosetting resin, and an impregnated paper layer formed by a paper impregnated with the thermosetting resin and cured, laminated from a surface side; and at least an uppermost surface of the base material layer comprises the impregnated paper layer formed by the paper impregnated with the thermosetting resin and cured. WO 2013/050910 A (UNILIN) discloses a Floor panel comprising a core (13), a print (16) and a wear resistant layer (17), wherein the core (13) is assembled at least from a plurality of paper sheets, or other carrier sheets (14), impregnated with a thermosetting resin (15).

Although EP2574476 A, EP 1700689 A and WO 2013/050910 A mention the use of inkjet printing in manufacturing decorative panels, they are all silent on the use of aqueous polymer latex based inkjet inks.

Hence, there is still a need for improved manufacturing methods of decorative surfaces using inkjet technology and melamine resin as a wear coating.

SUMMARY OF THE INVENTION

In order to overcome the problems described above, preferred embodiments of the present invention relate to a method for manufacturing decorative surfaces as defined below.

A much simpler solution has been found by rethinking the entire manufacturing process. One important aspect is the change of order of resin impregnation and printing. The prior art systems, as shown in FIG. 1, all first print a decorative colour pattern on paper by gravure or inkjet and then impregnate the printed paper by thermosetting resin. In our invention, the paper is first impregnated and then printed by inkjet, using aqueous inks that contain a polymer latex binder. This eliminates the need for a special ink-receiving layer on the paper substrate, in order to obtain good image quality. Simultaneously problems of incomplete and inhomogeneous resin impregnation due to the presence of such an ink-receiving layer on the paper surface are also avoided.

It was also observed that a too high ink lay down caused adhesion problems and blister formation when the different layers are heat-pressed together to form a decorative panel. A thermosetting resin, like a melamine formaldehyde resin (MF), polycondensates when exposed to heat in a pressing operation. The polycondensation reaction of MF resin creates water as a by-product, which must leave the hardening resin layer. The ink layer acts as a barrier layer for this water vapour, resulting in the observed adhesion problems and blister formation.

The major advantageous effect of invention is the much simpler manufacturing process of decorative panels, which is immediately visible by comparing FIG. 1 and FIG. 2 showing that our invention requires no longer an intermediate décor printer company (13) or a warehouse (17). Printing in-house at the floor laminate manufacturer (20) allows for maximum flexibility. Changes in design of a decorative colour pattern can be rapidly introduced in production, thereby also minimizing dependency on supply by the décor printer company (13). There are also no longer minimum purchase quantities to be negotiated with the décor printer company (13). In-house printing allows for fast adaptability to market trends and an increase of product variety without substantial financial penalties.

The replacement of gravure by inkjet also has many advantages. There is no longer a storage of gravure rolls necessary. Furthermore, inkjet allows easy colour reproduction compared to the time consuming colour matching issues in gravure which usually may take up to 5 hours of tuning. This immediately also illustrates that short print runs using inkjet is much more cost-efficient than gravure.

Resin impregnation can cause major paper loss. Financial loss is minimized if the paper is first impregnated and then inkjet printed, because less digital print has to be thrown away. Another advantage of first impregnating and then inkjet printing is dimensional stability, allowing for a wood grain to be embossed in perfect alignment of the inkjet printed wood colour pattern.

Further advantages and preferred embodiments of the present invention will become apparent from the following description.

DETAILED DESCRIPTION OF THE PREFERRED EMBODIMENTS

Definitions

Figure 1:
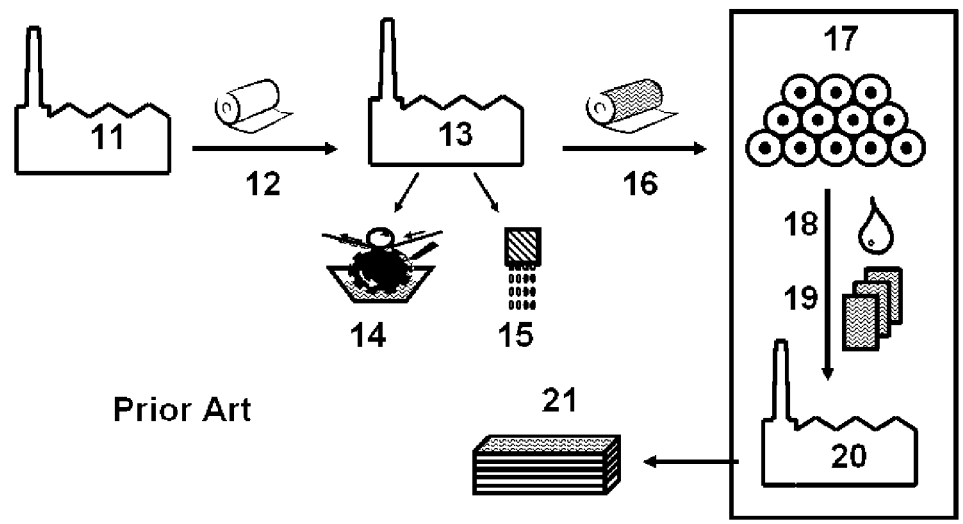
FIG. 1 shows the prior art production process for manufacturing decorative panels, wherein a paper manufacturer (11) supplies a paper roll (12) to a decor printer (13) using gravure printing (14) or inkjet printing (15) in order to deliver a decor paper roll (16) to a warehouse (17) of a floor laminate manufacturer (20). Depending on the market demand, the floor laminate manufacturer (20) selects one of the different decor rolls in his warehouse (17) to impregnate (18) and to cut to a size (19) for being heat pressed and finished into ready-to-use floor laminate (21).

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more substituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —$NO_2$.

Methods for Manufacturing Decorative Surfaces

The method for manufacturing decorative surfaces according to a preferred embodiment of the present invention includes the steps of: a) impregnating a paper substrate with a thermosetting resin; b) inkjet printing a colour pattern with one or more aqueous inkjet inks including a polymer latex binder on the thermosetting resin impregnated paper; and c) heat pressing the thermosetting paper carrying the colour pattern into a decorative surface. The presence of a polymer latex in the aqueous inkjet ink results in a good image quality without causing adhesion problems or blisters when heat pressed into floor laminate The paper of the decorative surface is first impregnated with a thermosetting resin before being inkjet printed upon. In one preferred embodiment, the thermosetting resin impregnated paper is first inkjet printed and then cut into a sheet.

Figure 2:
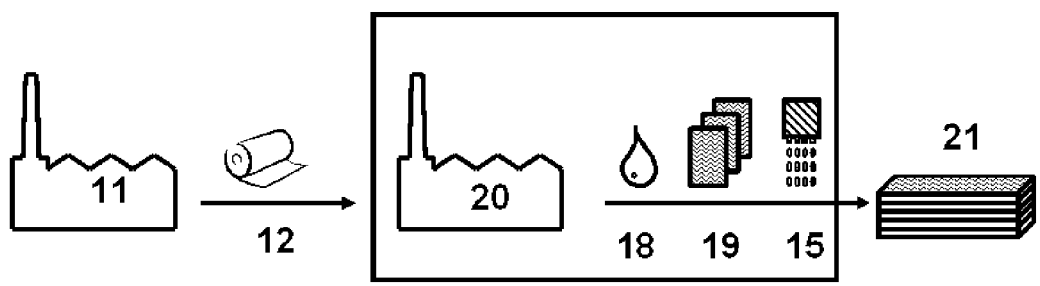
FIG. 2 shows a production process for manufacturing decorative panels, wherein a paper manufacturer (11) supplies a paper roll (12) directly to a floor laminate manufacturer (20) who impregnates (18) the paper roll (12), cuts to a size (19) for being inkjet printed (15) and then heat pressed and finished into ready-to-use floor laminate (21). The order of cutting to size (19) and inkjet printing (15) may also be reversed, i.e. printing on a impregnated paper roll before cutting to sheets.

In a preferred embodiment, as also shown in FIG. 2, the thermosetting resin impregnated paper is first cut into a sheet and then inkjet printed. In the latter, financial losses due to cutting errors is minimized.

The amount of ink lay down for printing the colour pattern is preferably less than 6 g/m² ink as dry weight. A higher amount can lead to delamination, i.e. adhesion problems, because the ink layer acts as a barrier layer for water vapour formed by the crosslinking of the thermosetting resin.

In a preferred embodiment of the manufacturing method, the thermosetting resin impregnated paper includes a coloured paper substrate, more preferably a bulk coloured paper substrate. The use of a coloured paper substrate reduces the amount of inkjet ink required to form the colour pattern.

In a preferred embodiment of the manufacturing method, the coloured paper substrate is prepared by impregnating the paper substrate with a coloured thermosetting resin.

In another preferred embodiment of the manufacturing method, the coloured paper substrate is prepared by coating a coloured layer on the paper substrate, preferably on the resin impregnated paper substrate.

In a preferred embodiment, the one or more aqueous inkjet inks are one or more pigmented aqueous inkjet inks.

In a preferred embodiment of the manufacturing method, the one or more aqueous inkjet inks include an aqueous inkjet ink containing a colour pigment selected from the group consisting of C.I Pigment Yellow 151, C.I. Pigment Yellow 74, and mixed crystals thereof In a preferred embodiment of the manufacturing method, the one or more aqueous inkjet inks include an aqueous inkjet ink containing a colour pigment selected from the group consisting of C.I Pigment Red 254, C.I. Pigment Red 122, and mixed crystals thereof.

In a preferred embodiment of the manufacturing method, the one or more aqueous inkjet inks form an aqueous inkjet ink set including:

a) a cyan aqueous inkjet ink containing a copper phthalocyanine pigment;

b) a red aqueous inkjet ink containing a colour pigment selected from the group consisting of C.I Pigment Red 254, C.I. Pigment Red 122, and mixed crystals thereof;

c) a yellow aqueous inkjet ink containing a colour pigment selected from the group consisting of C.I Pigment Yellow 151, C.I. Pigment Yellow 74, and mixed crystals thereof; and d) a black aqueous inkjet ink containing carbon black pigment. The use of such an aqueous CRYK inkjet ink set allows reducing the amount of inkjet ink required to reproduce a wooden décor for a floor laminate.

In a preferred embodiment of the manufacturing method, the thermosetting resin is a melamine based resin.

In a preferred embodiment of the manufacturing method, the one or more aqueous inkjet inks are inkjet printed at a jetting temperature of not more than 35° C.

For having a good ejecting ability and fast inkjet printing, the viscosity of the one or more aqueous inkjet inks at a temperature of 32° C. is preferably smaller than 30 mPa·s, more preferably smaller than 15 mPa·s, and most preferably between 1 and 10 mPa·s all at a shear rate of 1,000 s⁻¹. A preferred jetting temperature is between 10 and 70° C., more preferably between 20 and 40° C., and most preferably between 25 and 35° C.

In a preferred embodiment of the manufacturing method, the thermosetting resin impregnated paper carrying the colour pattern is heat pressed between a protective layer containing a thermosetting resin and a core layer, with the colour pattern facing the protective layer. In the latter, the thermosetting resin impregnated paper includes a whitening agent for masking surface defects of the core layer.

In another preferred embodiment of the manufacturing method, the thermosetting resin impregnated paper carrying the colour pattern is heat pressed as a protective layer into a decorative surface, with the colour pattern facing towards a core layer present in the decorative surface. In the latter, the protective layer (or overlay) includes a thermosetting resin impregnated paper containing no or substantially no whitening agent because the overlay becomes transparent after heat pressing so that the colour pattern van be viewed. The colour pattern must face the core layer because otherwise the colour pattern would rapidly deteriorate through wear.

In a preferred embodiment of the manufacturing method, the protective layer includes hard particles in an amount between 1 g/m² and 100 g/m².

In a preferred embodiment of the manufacturing method, the thermosetting resin is a melamine based resin. A melamine based resin is preferred not only because of its excellent physical properties against wear, but also because of the clear transparency after heat pressing showing no discolouration.

In a preferred embodiment of the manufacturing method, the polymer latex binder is a polyurethane based latex binder because of its high compatibility with a thermosetting resin, especially its high compatibility with a melamine based resin.

In a preferred embodiment of the manufacturing method, the inkjet printing is performed by a single pass printing inkjet printing process. This allows for a high productivity (m² decorative surface per hour).

In a preferred embodiment, the method of manufacturing a decorative surface comprises the step of hot pressing at least the core layer and the decorative layer which includes a colour pattern and a thermosetting resin provided paper. Preferably the method of the invention forms part of a DPL process as above described, wherein the decorative layer is taken up in a stack to be pressed with the core layer and a balancing layer, and preferably also a protective layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed colour pattern, wherein the thermosetting resin may be a colored thermosetting resin to reduce the amount of inkjet ink to be printed.

In a particularly preferred embodiment of the manufacturing method, at least the protective layer includes a relief 37 corresponding to the colour pattern. The relief in at least the protective layer is preferably provided by means of a short cycle embossing press. The embossing preferably takes place at the same time that the core layer, the decorative layer and the protective layer, and preferably also one or more balancing layers, are pressed together.

Preferably the relief comprises portions that have been embossed over a depth of more than 0.5 mm, or even more than 1 mm, with respect to the global upper surface of the decorative panel. The embossments may extend into the decorative layer.

The balancing layer of a decorative panel is preferably planar. However, a relief might be applied in the balancing layer(s) for improving gluing down of the panels and/or for improved slip resistance and/or for improved, i.e. diminished, sound generation or propagation.

It should be clear that the use of more than one press treatment is also advantageous for the present method of manufacturing decorative surfaces. Such technique could be used for the manufacturing of any panel that comprises on the one hand a wear resistant protective layer on the basis of a thermosetting synthetic material, possibly a carrier sheet such as paper, and hard particles, and, on the other hand, one or more layers underlying the wear resistant protective layer on the basis of thermosetting synthetic material. The underlying layers comprise a decorative layer, being an inkjet printed paper provided with thermosetting resin, wherein aqueous inks containing a polymer latex binder have been used during the inkjet printing. As a core layer, such panel might essentially comprise a board material with a density of more than 500 kg/m$^3$, such as an MDF or HDF board material. The manufacturing panels with a plurality of press treatments is preferably put in practice with the so-called DPL panels (Direct Pressure Laminate). In the latter case, during a first press treatment, at least the decorative layer provided with thermosetting resin, is cured and attached to the core material, preferably an MDF or HDF board material, whereby a whole is obtained of at least the decorative layer and the board material, and possibly a balancing layer at the side of the board opposite the decor layer. During a second press treatment, the wear resistant layer is cured and attached to the obtained whole.

In another preferred embodiment, the method for manufacturing a decorative surface uses inkjet printing in combination with the methodology disclosed by US 2011008624 (FLOORING IND), wherein the protective layer includes a substance that hardens under the influence of ultraviolet light or electron beams.

In a very preferred embodiment, the method of manufacturing of decorative surface includes the following steps: 1) impregnating a paper with a thermosetting resin; 2) inkjet printing, as described above, namely by means of polymer latex binder containing inks, a colour pattern on the thermosetting resin impregnated paper to produce a decorative layer; and 3) applying the decorative layer and a protective layer including a thermosetting resin impregnated paper on a mostly wood-based core layer by means of a short cycle embossing press and optionally at the same time creating relief in at least the protective layer. The thermosetting resin used in step 1) and/or 3) is preferably a resin or a combination of resins selected from the group consisting of melamine resin, urea resin, acrylate dispersion, acrylate copolymer dispersion and polyester resins, but is preferably a melamine resin. The mostly wood-based core used in step 3) is preferably MDF or HDF.

In an even more preferred embodiment, the decorative layer and the protective layer are applied on a mostly wood-based core layer by means of a short cycle embossing press and at the same time a relief is created in at least the protective layer.

The decorative panel obtained by the above preferred manufacturing methods preferably includes at least: 1) a transparent, preferably melamine based, protective layer; 2) an inkjet printed colour pattern; 3) a core, preferably an MDF or HDF core; and optionally 4) a relief at an upper surface, wherein the inks of the inkjet printed colour pattern include a polymer latex binder. In a preferred embodiment, the decorative panel includes the relief at the upper surface.

In a preferred embodiment, the decorative panel has an AC3 classification, more preferably an AC4 classification in accordance with EN 13329.

Aqueous Inkjet Ink Sets

A preferred aqueous inkjet ink set for manufacturing decorative surfaces consists of a) a cyan aqueous inkjet ink containing a copper phthalocyanine pigment; b) a red aqueous inkjet ink containing a colour pigment selected from the group consisting of C.I Pigment Red 254, C.I. Pigment Red 122, and mixed crystals thereof; c) a yellow aqueous inkjet ink containing a colour pigment selected from the group consisting of C.I Pigment Yellow 151, C.I. Pigment Yellow 74, and mixed crystals thereof; and d) a black aqueous inkjet ink containing carbon black pigment, wherein the aqueous inkjet inks include a polymer latex binder, more preferably a polyurethane based latex binder.

The aqueous inkjet inks preferably have a surface tension between 18.0 and 45.0 mN/m at 25° C. An aqueous inkjet ink with a surface tension smaller than 18.0 mN/m at 25° C. includes a high amount of surfactant, which may cause problems of foaming. A surface tension greater than 45.0 mN/m at 25° C. often leads to insufficient spreading of the ink on the thermosetting resin impregnated paper.

Colorants

The colorant in the one or more aqueous inkjet inks can be a dye, but is preferably a colour pigment. The one or more pigmented aqueous inkjet inks preferably contain a dispersant, more preferably a polymeric dispersant, for dispersing the pigment. The one or more may contain a dispersion synergist to improve the dispersion quality and stability of the ink.

In another preferred embodiment of the one or more pigmented aqueous inkjet inks, the one or more pigmented aqueous inkjet inks contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional. The preparation of self-dispersible colour pigments is well-known in the art and can be exemplified by EP 904327 A (CABOT).

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley—VCH, 2004. ISBN 3527305769.

A particularly preferred pigment for a cyan aqueous inkjet ink is a copper phthalocyanine pigment, more preferably C.I. Pigment Blue 15:3 or C.I. Pigment Blue 15:4.

Particularly preferred pigments for a red aqueous inkjet ink are C.I Pigment Red 254 and C.I. Pigment Red 122, and mixed crystals thereof.

Particularly preferred pigments for yellow aqueous inkjet ink are C.I Pigment Yellow 151 and C.I. Pigment Yellow 74, and mixed crystals thereof.

For the black ink, suitable pigment materials include carbon blacks such as Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black 7 and C.I. Pigment Black 11.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the inkjet ink includes a carbon black pigment and at least one pigment selected from the group consisting of a blue pigment, a cyan pigment, magenta pigment and a red pigment. It was found that such a black inkjet ink allowed easier and better colour management for wood colours.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of the pigment in the pigmented inkjet ink should be between 0.005 µm and 15 µm. Preferably, the average pigment particle size is between 0.005 and 5 µm, more preferably between 0.005 and 1 µm, particularly preferably between 0.005 and 0.3 µm and most preferably between 0.040 and 0.150 µm.

The pigment is used in the pigmented inkjet ink in an amount of 0.1 to 20 wt %, preferably 1 to 10 wt %, and most preferably 2 to 5 wt % based on the total weight of the pigmented inkjet ink. A pigment concentration of at least 2 wt % is preferred to reduce the amount of inkjet ink needed to produce the colour pattern, while a pigment concentration higher than 5 wt % reduces the colour gamut for printing the colour pattern with print heads having a nozzle diameter of 20 to 50 µm.

Dispersants

The pigmented inkjet ink preferably contains a dispersant, more preferably a polymeric dispersant, for dispersing the pigment.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight Mw between 500 and 30000, more preferably between 1500 and 10000.

The polymeric dispersant has preferably a weight average molecular weight Mw smaller than 100,000, more preferably smaller than 50,000 and most preferably smaller than 30,000.

In a particularly preferred embodiment, the polymeric dispersant used in the one or more pigmented inkjet inks is a copolymer comprising between 3 and 11 mol % of a long aliphatic chain (meth)acrylate wherein the long aliphatic chain contains at least 10 carbon atoms.

The long aliphatic chain (meth)acrylate contains preferably 10 to 18 carbon atoms. The long aliphatic chain (meth)acrylate is preferably decyl (meth)acrylate. The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

A commercially available polymeric dispersant being a copolymer comprising between 3 and 11 mol % of a long aliphatic chain (meth)acrylate is Edaplan™ 482, a polymeric dispersant from MUNZING.

Polymer Latex Binders

The polymer latex is not particularly limited as long as it has stable dispersibility in the ink composition. There is no limitation on the main chain skeleton of the water-insoluble polymer. Examples of the polymer include a vinyl polymer and a condensed polymer (e.g., an epoxy resin, polyester, polyurethane, polyamide, cellulose, polyether, polyurea, polyimide, and polycarbonate). Among the above, a vinyl polymer is particularly preferable because of easily controlled synthesis.

In a particularly preferred embodiment the polymer latex is a polyurethane latex, more preferably a self-dispersible polyurethane latex. The polymer latex binder in the one or more aqueous inkjet inks is preferably a polyurethane based latex binder for reasons of compatibility with the thermosetting resin.

In a particularly preferred embodiment, the one or more aqueous inkjet inks include inter-crosslinkable latex particles. Suitable examples are disclosed by EP 2467434 A (HP), however preferably the inter-crosslinking is obtained using (meth)acrylate groups.

Preferred hydrophobic monomers for synthesizing latexes include, without limitation, styrene, p-methyl styrene, methyl methacrylate, hexyl acrylate, hexyl methacrylate, 2-ethylhexyl acrylate, 2-ethylhexyl methacrylate, butyl acrylate, butyl methacrylate, ethyl acrylate, ethyl methacrylate, propyl acrylate, propyl methacrylate, octadecyl acrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, derivatives thereof, and mixtures thereof.

The polymerized monomers of the latex particulates preferably include a crosslinker that crosslinks the polymerized monomers and enhances the durability of the composite latex particulate. Suitable cross-linking monomers are polyfunctional monomers and oligomers such as, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene and combinations thereof, mixtures thereof, and derivatives thereof. When present, the cross-linkers preferably comprise from 0.1 wt % to 15 wt % of the polymerized monomers.

The polymer latex in the invention is preferably a self-dispersing polymer latex, and more preferably a self-dispersing polymer latex having a carboxyl group, from the viewpoint of ejecting stability and stability of the liquid (particularly, dispersion stability) when using a colour pigment. The self-dispersing polymer latex means a latex of a water-insoluble polymer that does not contain a free emulsifier and that can get into a dispersed state in an aqueous medium even in the absence of other surfactants due to a functional group (particularly, an acidic group or a salt thereof) that the polymer itself has.

In preparing a self-dispersing polymer latex, preferably a monomer is used selected from the group consisting of an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

The latex binder polymer particles preferably have a glass transition temperature (Tg) of 30° C. or more.

The minimum film-forming temperature (MFT) of the polymer latex is preferably −25 to 150° C., and more preferably 35 to 130° C.

Biocides

Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the pigmented inkjet ink.

Humectants

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof.

Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

Surfactants

The one or more aqueous inkjet inks may contain at least one surfactant. The surfactant(s) can be anionic, cationic, non-ionic, or zwitter-ionic and are usually added in a total quantity less than 5 wt % based on the total weight of the inkjet ink and particularly in a total less than 2 wt % based on the total weight of the inkjet ink.

The one or more aqueous inkjet inks preferably have a surface tension between 18.0 and 45.0 mN/m at 25° C., more preferably between a surface tension between 21.0 and 39.0 mN/m at 25° C.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

A particularly preferred commercial fluorosurfactant is Capstone™ FS3100 from DU PONT.

Preparation of Inkjet Inks

The one or more aqueous inkjet inks may be prepared by precipitating or milling the colour pigment in the dispersion medium in the presence of the polymeric dispersant, or simply by mixing a self-dispersible colour pigment in the ink.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media. The weight ratio of pigment over dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Decorative Surfaces

The decorative surfaces are preferably rigid or flexible panels, but may also be rolls of a flexible substrate. In a preferred embodiment the decorative panels are selected from the group consisting of kitchen panels, flooring panels, furniture panels, ceiling panels and wall panels.

Figure 3:
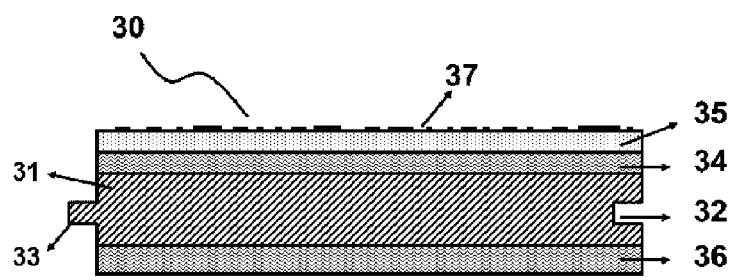
FIG. 3 shows a cross-section of a decorative panel (30) including a core layer (31) with a groove (32) and tongue (33) which is laminated on the top side by a decorative layer (34) and a protective layer (35) and on the back side by a balancing layer (36).

A decorative panel (30), illustrated by a flooring panel having also a tongue and groove join (33, 32) in FIG. 3, includes preferably at least a core layer (31) and a decorative layer (34). In order to protect the colour pattern of the decorative layer (34) against wear, a protective layer (35) may be applied on top of the decorative layer (34). A balancing layer (36) may also be applied at the opposite side of the core layer (31) to restrict or prevent possible bending of the decorative panel (30). The assembly into a decorative panel of the balancing layer, the core layer, the decorative layer, and preferably also a protective layer, is preferably performed in the same press treatment of preferably a DPL process (Direct Pressure Laminate).

In a preferred embodiment of decorative panels, tongue and groove profiles (33 respectively 32 in FIG. 3) are milled into the side of individual decorative panels which allow them to be slid into one another. The tongue and grove join ensures, in the case of flooring panels, a sturdy floor construction and protects the floor, preventing dampness from penetrating.

Figure 4:
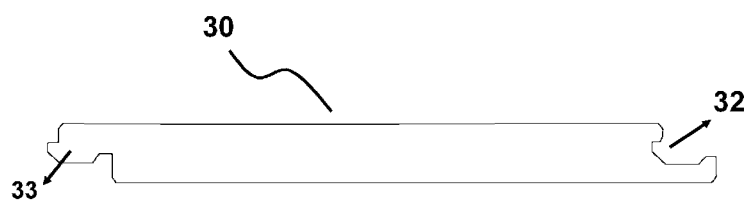
FIG. 4. shows a cross section of a decorative panel (30) having a mechanical join by a tongue (33) and a groove (32) requiring no glue.

In a more preferred embodiment, the decorative panels include a tongue and a groove of a special shape (e.g. 33 respectively 32 in FIG. 4) which allow them to be clicked into one another. The advantage thereof is an easy assembly requiring no glue. The shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative surfaces, especially decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative surfaces as exemplified by EP 1567334 A (FLOORING IND).

The top surface of the decorative surface, i.e. at least the protective layer, is preferably provided with a relief matching the colour pattern, such as for example the wood grain, cracks and nuts in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

In a preferred embodiment, the decorative panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special preferred embodiment the length of the panels exceeds 2 meter, with the width being preferably about 0.2 meter or more. The print of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Also, use can be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably, if present also the protective layer and/or balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m$^2$ and possibly up to 130 g/m$^2$. The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m$^2$ to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer which can cause undesired colour effects on the colour pattern.

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to print the colour pattern. For example, a light brown or grey paper may be used for printing a wood motif as colour pattern in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m$^2$ having a high porosity and made from clean low kappa hardwood Kraft of good uniformity.

If the protective layer includes a paper, then a paper is used which becomes transparent or translucent after resin impregnation so that for the colour pattern in the decorative layer can be viewed.

The above papers may also be used in the balancing layer.

It was found in the present invention that no special ink receiving layer or substance was necessary for obtaining good image quality. Hence, the paper is preferably free of any separate ink receiving layer upon printing.

For the sake of clarity, it should be clear that resin coated papers, so-called RC papers, are not the thermosetting resin impregnated papers of the manufacturing method according to the invention. The RC papers used in home/office aqueous inkjet printing consist of a porous paper core free of resin. The RC papers have only on their surface a resin coating, usually a polyethylene or polypropylene resin coating, with thereon one or more ink receiving layers, usually containing a hydrophilic polymer like polyvinylalcohol and optionally porous pigments like fumed silica. Such RC papers have a low permeability for the thermosetting resin leading to inhomogeneous resin absorption and higher risk for delamination after pressing.

Thermosetting Resins

The thermosetting resin is preferably selected from the group consisting of melamine-formaldehyde based resins, ureum-formaldehyde based resins and phenol-formaldehyde based resins.

Other suitable resins for impregnating the paper are listed in [0028] of EP 2274485 A (HUELSTA).

Most preferably the thermosetting resin is a melamine-formaldehyde based resin, often simply referred to in the art as a 'melamine (based) resin'.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, however the present invention provides measures for limiting such hindrance.

The paper is preferably provided with an amount of thermosetting resin equalling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin, that at least the paper core is satisfied with the resin. Such satisfaction can be reached when an amount of resin is provided that corresponds to at least 1.5 or at least 2 times the paper weight. Preferably the paper is firstly impregnated through or satisfied, and, afterwards, at least at the side thereof to be printed, resin is partially removed.

Preferably the resin provided on said paper is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from U.S. Pat. No. 4,109,043 (FORMICA CORP)

and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

The advantage of adding a colorant to the mixture containing the thermosetting resin is that a single type of white paper can be used for manufacturing the decorative layer, thereby reducing the stock of paper for the decorative laminate manufacturer. The use of a colored paper, as already described above, to reduce the amount of ink required for printing a wood motif, is here accomplished by the white paper being colored by impregnation by a brownish thermosetting resin. The latter allows a better control of the amount of brown colour required for certain wood motifs.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Decorative Layers

The decorative layer includes a thermosetting resin impregnated paper and a colour pattern printed thereon by inkjet. In the assembled decorative panel, the colour pattern is located on the resin impregnated paper on the opposite side than the side facing the core layer.

Before printing a colour pattern, or at least a portion thereof, the paper that has been provided with resin. This measure improves the stability of the paper. In such cases at least a portion of the expansion or shrinkage due to the resin provision takes place before inkjet printing. Preferably the resin provided paper is dried before inkjet printing, for example to a residual humidity of 10% or less. In this case the most important portion of the expansion or shrinkage of the paper layer is neutralized. The advantage of having this dimensional stability is especially observed in the cases where, like in EP 1290290 A (FLOORING IND), a correspondence between the relief and the printed decor is desired.

A decorative panel, like a floor panel, has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

Colour Patterns

The colour pattern is obtained by jetting and drying one or more aqueous inkjet inks of an aqueous inkjet ink set upon on a thermosetting resin impregnated paper, wherein said one or more aqueous inkjet inks include a polymer latex binder.

The colour pattern represents preferably less than 6 g/m$^2$ ink, more preferably less than 5 g/m$^2$ ink, and most preferably between 1.2 and 4.0 g/m$^2$ ink as dry weight.

There is no real restriction on the content of the colour pattern. The colour pattern may also contain information such as text, arrows, logo's and the like. The advantage of inkjet printing is that such information can be printed at low volume without extra cost, contrary to gravure printing.

In a preferred embodiment, the colour pattern is a wood reproduction or a stone reproduction, but it may also be a fantasy or creative pattern, such as an ancient world map or a geometrical pattern, or even a single colour for making, for example, a floor consisting of black and red tiles or a single colour furniture door.

An advantage of printing a wood colour pattern is that a floor can be manufactured imitating besides oak, pine and beech, also very expensive wood like black walnut which would normally not be available for house decoration.

An advantage of printing a stone colour pattern is that a floor can be manufactured which is an exact imitation of a stone floor, but without the cold feeling when walking barefooted on it.

Protective Layers

Preferably a further resin layer, a protective layer, is applied above the printed pattern after printing, e.g. by way of an overlay, i.e. a resin provided carrier, or a liquid coating, preferably while the decor layer is laying on the substrate, either loosely or already connected or adhered thereto.

In a preferred embodiment, the carrier of the overlay is a paper impregnated by a thermosetting resin that becomes transparent or translucent after heat pressing in a DPL process.

A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another preferred embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725829 C (LS INDUSTRIELACKE) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 g/m$^2$ and 100 g/m$^2$, preferably 2 g/m$^2$ to 50 g/m$^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

In an alternative preferred embodiment of a protective layer including a paper as carrier sheet for the thermosetting resin, the inkjet printing is performed on the thermosetting resin impregnated paper of the protective layer. The other paper substrate including a whitening agent, such as titanium dioxide, may then merely be used to mask surface defects of the core layer.

The amount of hard particles in the protective layer may determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 μm are preferred. Preferably an amount of such particles of between 1 and 40 $g/m^2$ is applied above the printed pattern. An amount lower than 20 $g/m^2$ can suffice for the lower qualities.

If the protective layer includes a paper, then it preferably has a paper weight of between 10 and 50 $g/m^2$. Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed pattern involves a press treatment. Preferably a temperature above 150° C. is applied in the press treatment, more preferably between 180° and 220° C., and a pressure of more than 20 bar, more preferably between 35 and 40 bar.

In a very preferred embodiment, the decorative panel is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour pattern or below the colour pattern and stay in the zone where they are most effective, namely essentially above the colour pattern. This makes it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 μm or less, or even of 5 μm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer, that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Inkjet Printing Devices

The one or more aqueous inkjet inks, including the polymer latex binder, may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the manufacturing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing is preferred for obtaining a high area throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

EXAMPLES

Materials

All materials used in the following examples were readily available from standard sources such as Aldrich Chemical Co. (Belgium) and Acros (Belgium) unless otherwise specified.

PB15:3 is an abbreviation used for Hostaperm™ B4G-KR, a C.I. Pigment Blue 15:3 pigment from CLARIANT.

PR254 is the abbreviation for C.I. Pigment Red 254 for which Irgazin™ DPP Red BTR from Ciba Specialty Chemicals was used.

PY151 is an abbreviation used for INK JET H4G LV 3853, a C.I. Pigment Yellow 151 from CLARIANT.

PBL7 is an abbreviation used for Printex™ 90, a carbon black pigment from EVONIK.

Edaplan is an abbreviation used for Edaplan™ 482, a polymeric dispersant from MUNZING.

Proxel is an abbreviation used for the biocide Proxel™ Ultra 5 from AVECIA.

PEG 200 is a polyethylene glycol having an average molecular mass of 200 from CLARIANT.

PEG 600 is a polyethylene glycol having an average molecular weight between 570 and 630 g/mol from CALDIC BELGIUM nv.

TEA is triethanol amine.

PY139 is Graphtol™ Yellow H2R VP2284, a C.I. Pigment Yellow 139 from CLARIANT.

PY110 is IRGAZIN™ YELLOW L 2040, a C.I. Pigment Yellow 110 from BASF.

PY120 is NOVOPERM™ YELLOW H2G, a C.I. Pigment Yellow 120 from CLARIANT.

PY128 is CROMOPHTAL™ JET YELLOW 8GT, a C.I. Pigment Yellow 128 from BASF.

PY73 is HANSA™ BRILLIANT YELLOW 4GX, a C.I. Pigment Yellow 73 from CLARIANT.

PY154 is HOSTAPERM™ YELLOW H3G, a C.I. Pigment Yellow 154 from CLARIANT.

PY55 is SEIKAFAST™ YELLOW 2500, a C.I. Pigment Yellow 55 from Dainichiseika Colour & Chemicals Mfg. Co.

PY97 is Novoperm™ Yellow FGL, a C.I. Pigment Yellow 97 from CLARIANT.

PY17 is GRAPHTOL™ YELLOW GG, a C.I. Pigment Yellow 17 from CLARIANT.

PY138 is Paliotol™ Yellow D0960, a C.I. Pigment Yellow 138 from BASF.

Cab-O-Jet™ 450C is a 15% dispersion of C.I. Pigment Blue 15:4 in water having an average particle size of 115 nm.

Cab-O-Jet™ 465M is a 15% dispersion of C.I. Pigment Red 122 in water having an average particle size of 100 nm.

Cab-O-Jet™ 470Y is a 15% dispersion of C.I. Pigment Yellow 74 in water having an average particle size of 170 nm.

Cab-O-Jet™ 300 is a 15% dispersion of C.I. Pigment Black 7 in water having an average particle size of 130 nm.

D75C is a 15% dispersion of C.I. Pigment Blue 15:3 in water having a surface tension of 55 mN/m and an average particle size of 100 nm.

D71M is a 15% dispersion of C.I. Pigment Red 122 in water having a surface tension of 50 mN/m and an average particle size of 145 nm.

D75Y is a 15% dispersion of C.I. Pigment Yellow 74 in water having a surface tension of 55 mN/m and an average particle size of 100 nm.

D73K is a 15% dispersion of C.I. Pigment Black 7 in water having a surface tension of 55 mN/m and an average particle size of 105 nm.

Emuldur™ 381A is a 40% solids latex dispersion in water of a polyester-polyurethane polymer having a glass transition temperature of 30° C.

Capstone™ FS3100 is a fluorosurfactant from DU PONT.

MH is a 120 g/m² matt coated paper available as MH 1281 from MITSUBISHI.

Measurement Methods

1. CIELAB Parameters

The reflectance spectrum of each sample was measured three times with a Gretag SPM50 spectrophotometer in the range from 380 up to 730 nm in steps of 10 nm.

Unless otherwise specified, the CIE L* a* b* coordinates as well as chroma C* and hue angle H* were calculated for a 2° observer and a D50 light source.

2. Metameric Index MI

Metamerism is a phenomenon which occurs when two materials match in colour under some lighting conditions but not under other lighting conditions. A customer expects all parts of e.g. a kitchen cabinet that are the same colour to match whether viewed in daylight, under halogen lighting or under Neon lighting.

In the CIELAB colour space, a colour is defined using three terms L*, a*, and b*. L* defines the lightness of a colour, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as hue angle H* and chroma C* are used to further describe a given colour, wherein:

$$H^* = \tan^{-1}(b^*/a^*) \qquad \text{equation 1}$$

$$C^* = (a^{*2} + b^{*2})^{1/2} \qquad \text{equation 2.}$$

In the CIELAB colour space, $\Delta E^*$ defines the "colour-distance", i.e. the difference between two colours, such as the colour of the original printed image and the colour of the same image after light fading. The higher the $\Delta E^*$ number, the more difference between the two colours:

$$\Delta E^* = (\Delta L^{*2} + \Delta a^{*2} + \Delta b^{*2})^{1/2} \qquad \text{equation 3.}$$

The CIE 1994 Colour Difference Model provided an improved calculation of the colour difference by including some weighing factors. The colour difference measured under the new model is indicated by $\Delta E94$.

$$\Delta E_{94}^* = \sqrt{\left(\frac{\Delta L^*}{K_L}\right)^2 + \left(\frac{\Delta C^*}{1 + K_1 C_1^*}\right)^2 + \left(\frac{\Delta H^*}{1 + K_2 C_1^*}\right)^2}, \qquad \text{equation 4}$$

wherein:

$$\Delta L^* = L_1^* - L_2^*, C_1^* = \sqrt{a_1^{*2} + b_1^{*2}}, C_2^* = \sqrt{a_2^{*2} + b_2^{*2}},$$

$$\Delta C^* = C_1^* - C_2^*, \Delta a^* = a_1^* - a_2^*, \Delta b^* = b_1^* - b_2^* \text{ and}$$

$$\Delta H^* = \sqrt{\Delta E^{*2} - \Delta L^{*2} - \Delta C^{*2}} = \sqrt{\Delta a^{*2} + \Delta b^{*2} - \Delta C^{*2}}$$

and where the weighting factors depend on the application. For decoration applications: $K_L = 1$, $K_1 = 0.045$ and $K_2 = 0.015$.

For metamerism, two materials are considered. For example, in case of deco printing of wood colours, the first (or reference) material could be a piece of natural wood of some kind or a kitchen cabinet door, produced with rotogravure techniques. The second material may be the best possible reproduction of that first material by means of inkjet printing.

The reflectance spectrum of both materials is calculated for a selected set of light sources out of a list of 19 light sources:

Equi-energetic light source: CIE illuminant E

Daylight: D50, D55, D65

CIE standard illuminants: A (tungsten filament), B (direct daylight), C (shady daylight)

Fluorescent: CIE F-series F1 up to F12

The reflectance spectrum of each sample was measured three times with a Gretag SPM50 spectrophotometer in the range from 380 up to 730 nm in steps of 10 nm. Calculation involved the reflectance spectrum of the material in combination with the light source spectrum. The CIE L* b* coordinates for a 2° observer as well as chroma C* and hue angle H* were calculated for each material and for each light source.

For each light source, the difference values for $\Delta L^*$, $\Delta a^*$, $\Delta b^*$, $\Delta C^*$, $\Delta H^*$ and the colour-distance $\Delta E^*94$ were calculated for the two materials, i.e. the reference material and the printed material, which thus delivered 19 sets of difference values for each reference sample and inkjet printed material. Simple descriptive statistics on the 19 sets of difference values was calculated.

The metameric index for the 2 materials was defined as three times the standard deviation of ΔE*94. The smaller the metameric index, the less colour difference between the 2 materials will be seen when they are compared to each other whilst changing light source within the selected set of 19 light sources. For a true reproduction of wood colours having minimal metamerism, the metameric index should have a value of no more than 1.0.

3. Surface Tension

The static surface tension of the aqueous inkjet inks was measured with a KRÜSS tensiometer K9 from KRÜSS GmbH, Germany at 25° C. after 60 seconds.

4. Viscosity

The viscosity of an inkjet ink was measured, using a Brookfield DV-II+ viscometer at 32° C. at a shear rate of 1,000 $s^{-1}$.

5. Average Particle Size

An ink sample is diluted with ethyl acetate to a pigment concentration of 0.002 wt %. The average particle size of pigment particles is determined with a Nicomp™ 30 Submicron Particle Analyzer based upon the principle of dynamic light scattering.

For good ink jet characteristics (jetting and print quality) the average particle size of the dispersed particles is preferably below 250 nm.

6. Ink Stability

The inkjet ink is considered to be a stable pigment dispersion if the average particle size did not increase by more than 15% after a heat treatment of 7 days at 60° C.

The inkjet ink is considered to be a stable pigment dispersion if the viscosity did not increase by more than 10% after a heat treatment of 7 days at 60° C.

7. Lightfastness

The lightfastness was determined as the colour hue shift ΔE94* between a print sample measured one hour after printing and the same print after 1 week exposure to Xenon light in a Atlas Xenotest™ 150S at an irradiance of 300-800 nm at 1250 W/m2 performed indoor behind window glass.

A colour hue change ΔE94*-value of 1.0 is clearly visible to the naked eye.

8. Blue Wool Scale

The Blue Wool Scale was used as a measure of lightfastness of inkjet printed samples. The test originates from the textile industry, but has been adopted by the laminate flooring industry (see e.g. the website ww.eplf.com from the European Producers of Laminate Flooring).

Two identical samples were made. One was placed in the dark as the control and the other was placed in the equivalent of sunlight for a three-month period. A standard blue wool textile fading test card conform to the ISO 105-b01 standard was also placed in the same light conditions as the sample under test. The amount of fading of the sample was then assessed by comparison to the original colour.

A rating between 0 and 8 is awarded by identifying which one of the eight strips on the blue wool standard card has faded to the same extent as the sample under test. Zero denotes extremely poor colour fastness whilst a rating of eight is deemed not to have altered from the original and thus credited as being lightfast and permanent.

The flooring industry expects a laminate floor to have a rating on the blue wool scale of 6 or more.

9. Latency

Latency is the time that nozzles can be left uncovered and idle before there is a significant reduction in performance, for instance a reduction in drop velocity that will noticeably affect the image quality or even failing nozzles which no longer eject the ink.

Prints were made using a KJ4B Kyocera print head at a head temperature of 32° C. at 600 dpi on a glossy microporous paper after having left the nozzles uncovered and idle for 10 minutes, 20 minutes, 30 minutes and 60 minutes. An evaluation was made of the image quality on the printed sample by checking failing nozzles and image unevenness.

If no negative effect was observed at 60 minutes, then the latency was considered to be more than 60 minutes. Alternatively, if after 10 minutes no good image quality was observed, the latency was considered to be less than 10 minutes. An intermediate latency was observed between 10 and 60 minutes, the longer the open head time could be, the better the latency. A latency of more than 30 minutes is desirable.

10. Adhesion

Adhesion is evaluated by a cross-cut test according to ISO2409:1992(E). Paints. *International standard*. 1992-08-15. using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion described by Table 1.

TABLE 1

| Criterion | Observation |
| --- | --- |
| 0 | The edges of the cuts are completely smooth: none of the squares of the lattice is detached (=perfect adhesion). |
| 1 | Detachment of small flakes at the intersections of the cuts. A cross-cut area not greater than 5% is affected. |
| 2 | Flaked along the edges and/or at the intersections of the cuts. A cross-cut area greater than 5%, but not significantly greater than 15%, is affected. |
| 3 | Flaked along the edges of the cuts partly or wholly in large ribbons, and/or it has flaked partly or wholly on different parts of the squares. A cross-cut area significantly greater than 15%, but not significantly greater than 35%, is affected. |
| 4 | Flaked along the edges of the cuts in large ribbons, and/or some of the squares has detached partly or wholly. A cross-cut area significantly greater than 35%, but not significantly greater than 65%, is affected. |
| 5 | Any degree of flaking that cannot even be classified by classification 4 |

11. Bleeding

The colour bleeding of inks occurs due to the water vapour produced during the DPL process, which deplaces colour pigments or dyes. An evaluation was made in accordance with a criterion described in Table 2.

TABLE 2

| Criterion | Observation |
| --- | --- |
| 0 | no bleeding |
| 1 | some bleeding visible by microscope |
| 2 | some bleeding visible by the naked eye |
| 3 | large amount of bleeding visible by the naked eye |

12. Blisters

The further crosslinking of the melamine-formaldehyde resin during the DPL process forms water which due to the high temperature is immediately vaporized and may cause delamination between e.g. the decorative layer and the protective layer resulting in an enclosed raised spot (as in paint) resembling a blister.

TABLE 3

| Criterion | Observation |
| --- | --- |
| 0 | No blisters |
| 1 | some small blisters |
| 2 | large blisters |
| 3 | delamination of protective layer |

Example 1

This example illustrates an aqueous inkjet ink set which is suitable for printing colour patterns for flooring laminates and which also has sufficient reliability for industrial inkjet ink printing.

Preparation of Inkjet Inks

Each of the inkjet inks was prepared in the same manner by diluting a concentrated pigment dispersion with the other ink ingredients.

The concentrated aqueous pigment dispersion was made in the same manner for each colour pigment by mixing a composition according to Table 4 for 30 minutes using a Disperlux™ Yellow mixer.

TABLE 4

| Component | Concentration (wt %) |
| --- | --- |
| Pigment | 15.00 |
| Edaplan | 15.00 |
| Proxel | 0.02 |
| Water | to complete 100.00 wt % |

Each concentrated aqueous pigment dispersion was then milled using a Dynomill™ KDL with 0.04 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The concentrated aqueous pigment dispersion served as the basis for the preparation of the inkjet ink.

The inkjet inks were prepared by mixing the components according to the general formulation of Table 5 expressed in weight % based on the total weight of the ink. The component TEA was used to obtain a pH between 8.5 and 8.2. Water was added to complete the ink to the desired pigment concentration.

TABLE 5

| Component (in wt %) | C | R | Y | K |
| --- | --- | --- | --- | --- |
| PB15:3 | 2.20 | — | — | — |
| PR254 | — | 2.70 | — | — |
| PY151 | — | — | 3.85 | — |
| PBL7 | — | — | — | 2.70 |
| Edaplan | 2.20 | 2.70 | 3.85 | 2.70 |
| 1,2-Hexanediol | 3.00 | 3.00 | 2.50 | 3.00 |
| Glycerine | 20.00 | 20.00 | 20.00 | 20.00 |
| PEG 200 | 20.00 | 18.00 | 13.00 | — |
| PEG 600 | — | — | — | 11.90 |
| Proxel | 0.01 | 0.01 | 0.01 | 0.01 |
| TEA | 0.60 | 0.50 | 0.70 | 0.50 |
| Water | to complete 100.00 wt % | | | |
| Viscosity (mPa · s) at 32° C. | 5.5 | 5.3 | 4.6 | 5.2 |
| Surface Tension (mN/m) | 35.9 | 35.6 | 35.4 | 35.6 |
| Average particle size (nm) | 153 | 150 | 220 | 123 |

The yellow inkjet ink was found to be the most critical one for performance of the four inkjet inks. As reliability for industrial inkjet printing becomes more critical at higher pigment concentrations, a number of yellow inkjet inks Y1 to Y10 were prepared in the same manner as the inkjet ink Y of Table 5, except that the concentration of the yellow pigment and the dispersant was increased to 4.70 wt % based on the total weight of the yellow inkjet ink.

TABLE 6

| Inkjet Ink | Type of Pigment |
| --- | --- |
| Y1 | PY151 |
| Y2 | PY74 |
| Y3 | PY110 |
| Y4 | PY128 |
| Y5 | PY120 |
| Y6 | PY73 |
| Y7 | PY154 |
| Y8 | PY55 |
| Y9 | PY97 |
| Y10 | PY138 |

Evaluation and Results

Latency

The latency of the cyan, magenta, black inkjet inks of Table 7 and the yellow inkjet inks of Table 8 having a pigment concentration of 4.70 wt % was tested. The results are shown by Table 7.

TABLE 7

| Inkjet Ink | Type of Pigment | Latency |
| --- | --- | --- |
| C | PB15:3 | More than 30 minutes |
| R | PR254 | More than 60 minutes |
| K | PBL7 | More than 30 minutes |
| Y1 | PY151 | More than 30 minutes |
| Y2 | PY74 | More than 30 minutes |
| Y3 | PY110 | Less than 10 minutes |
| Y4 | PY128 | Less than 10 minutes |
| Y5 | PY120 | More than 30 minutes |
| Y6 | PY73 | Less than 10 minutes |
| Y7 | PY154 | Less than 10 minutes |
| Y8 | PY55 | Less than 10 minutes |
| Y9 | PY97 | Less than 10 minutes |
| Y10 | PY138 | Less than 10 minutes |

From Table 7, the latency of the cyan, magenta, black inkjet inks exhibited good latency, while only the yellow inks containing the pigments PY151, PY74 and PY120 exhibited good latency.

Ink Stability

The ink stability was tested by comparing the average particle size and the viscosity after a heat treatment of 1 week at 60° C. The results are shown in Table 8.

TABLE 8

| | | Average Particle Size | | Viscosity | |
| --- | --- | --- | --- | --- | --- |
| Inkjet Ink | Pigment | nm | % Increase after 1 week at 60° C. | mPa · s | % Increase after 1 week at 60° C. |
| C | PB15:3 | 153 | 0% | 5.5 | 0% |
| R | PR254 | 150 | 1% | 5.3 | 0% |
| K | PBL7 | 123 | 0% | 5.2 | 0% |
| Y1 | PY151 | 220 | 0% | 4.6 | 0% |
| Y2 | PY74 | 140 | 16% | 4.7 | 5% |
| Y3 | PY110 | 166 | 0% | 4.2 | 4% |
| Y4 | PY128 | 188 | 114% | 6.5 | 190% |
| Y5 | PY120 | 189 | 0% | 4.2 | 0% |
| Y6 | PY73 | 250 | 0% | 5.0 | 0% |
| Y7 | PY154 | 266 | 81% | 4.3 | 13% |

TABLE 8-continued

| | | Average Particle Size | | Viscosity | |
|---|---|---|---|---|---|
| Inkjet Ink | Pigment | nm | % Increase after 1 week at 60° C. | mPa · s | % Increase after 1 week at 60° C. |
| Y8 | PY55 | 175 | 0% | 4.4 | 0% |
| Y9 | PY97 | 224 | 3% | 5.0 | 0% |
| Y10 | PY138 | 174 | 0% | 5.4 | 0% |

It can be seen from Table 10 that the inkjet inks containing the yellow pigments PY128 and PY154 exhibited insufficient ink stability for reliable printing in an industrial environment.

Lightfastness

A colour patch of 100% surface coverage was printed using a KJ4B Kyocera print head at a head temperature of 32° C. at 600 dpi on a MH paper substrate.

The lightfastness of the yellow inkjet ink was again found to be the most critical one. The lightfastness results of the printed samples before and after 1 week of Xenon exposure are shown in Table 9, respectively Table 10.

TABLE 9

| Inkjet Ink | Pigment | L* | a* | b* | C* | H* |
|---|---|---|---|---|---|---|
| Y1 | PY151 | 89.12 | −14.98 | 91.23 | 92.45 | 99.32 |
| Y2 | PY74 | 85.56 | −6.81 | 107.70 | 107.91 | 93.62 |
| Y3 | PY110 | 78.26 | 13.99 | 111.79 | 112.66 | 82.87 |
| Y4 | PY128 | 89.22 | −19.72 | 94.72 | 96.75 | 101.76 |
| Y5 | PY120 | 86.20 | −12.31 | 91.55 | 92.38 | 97.66 |
| Y6 | PY73 | 86.77 | −10.92 | 102.94 | 103.51 | 96.06 |
| Y7 | PY154 | 88.36 | −11.99 | 91.43 | 92.21 | 97.47 |
| Y8 | PY55 | 82.31 | 4.18 | 120.76 | 120.84 | 88.02 |
| Y9 | PY97 | 88.25 | −13.40 | 97.61 | 98.53 | 97.81 |
| Y10 | PY138 | 88.69 | −20.85 | 92.91 | 95.22 | 102.65 |

TABLE 10

| Inkjet Ink | Pigment | ΔL* | Δa* | Δb* | ΔC* | ΔH* | ΔE94* |
|---|---|---|---|---|---|---|---|
| Y1 | PY151 | 0.19 | −0.95 | −1.73 | −1.56 | 1.21 | 0.61 |
| Y2 | PY74 | −0.53 | 0.29 | −0.10 | −0.12 | 0.28 | 0.54 |
| Y3 | PY110 | 0.51 | −2.04 | 0.34 | 0.07 | 2.07 | 0.92 |
| Y4 | PY128 | 0.08 | −1.40 | −2.34 | −2.03 | 1.82 | 0.83 |
| Y5 | PY120 | 0.84 | −1.36 | −1.33 | −1.14 | 1.52 | 1.07 |
| Y6 | PY73 | −1.72 | 0.08 | 0.02 | 0.00 | 0.08 | 1.72 |
| Y7 | PY154 | 0.02 | −0.80 | −1.28 | −1.17 | 0.95 | 0.46 |
| Y8 | PY55 | 3.13 | −8.59 | 12.31 | 11.64 | 9.48 | 5.16 |
| Y9 | PY97 | −0.06 | −1.44 | −0.85 | −0.65 | 1.54 | 0.63 |
| Y10 | PY138 | −0.49 | −2.45 | −4.32 | −3.73 | 3.28 | 1.57 |

The best results for Xenon lightfastness were found for the yellow pigments PY151, PY74, PY154 and PY97.

Since the inkjet inks containing PY154 and PY97 failed on reliable inkjet printing and the other yellow inkjet inks performed poorly in the Xenon lightfastness test, only the yellow inkjet inks Y1 and Y2 containing PY151, respectively PY74 were submitted to the Blue Wool Scale test. Table 13 gives the lightfastness results of the yellow inkjet inks Y1 and Y2 by using the Blue Wool Scale test.

TABLE 11

| Inkjet Ink | Pigment | Blue Wool Scale |
|---|---|---|
| Y1 | PY151 | 6 to 7 |
| Y2 | PY74 | <3 |

Although the ink Y2 scored a bit better than the ink Y1 on the Xenon lightfastness test, the ink Y2 surprisingly failed on the Blue Wool Scale test using sun light. The yellow inkjet ink Y1 met the expectations of the flooring industry with a rating on the blue wool scale of more than 6.

Metamerism

The metamerism was evaluated using as reference material, a coating of a UV curable yellow inkjet ink Agora™ G2 from Agfa Graphics nv. Such an ink is successfully used for printing on plastic surfaces, for example on furniture side bands of a laminate MDF panel.

The Agora™ G2 inkjet ink was coated at a thickness of 6 μm on a PET100 substrate using a bar coater. The coated sample was fully cured using a Fusion DRSE-120 conveyer, equipped with a Fusion VPS/1600 lamp (D-bulb), which transported the sample under the UV-lamp on a conveyer belt at a speed of 20 m/min.

As second material for the metamerism test, a sample was printed of yellow inkjet ink using a KJ4B Kyocera print head at a head temperature of 32° C. at 600 dpi on a paper substrate PGA at 100% surface coverage. The results of the metamerism are shown in Table 12.

TABLE 12

| Inkjet Ink | Pigment | MI |
|---|---|---|
| Y1 | PY151 | 0.99 |
| Y2 | PY74 | 3.67 |
| Y3 | PY110 | 9.77 |
| Y4 | PY128 | 0.63 |
| Y5 | PY120 | 2.36 |
| Y6 | PY73 | 2.01 |
| Y7 | PY154 | 1.90 |
| Y8 | PY55 | 1.93 |
| Y9 | PY97 | 2.31 |
| Y10 | PY138 | 0.40 |

Table 14 shows that only the reliable, lightfast inkjet ink Y1 has a metameric index value of no more than 1.00.

Example 2

This example illustrates the manufacturing of a decorative surface using a manufacturing method.

Manufacturing of Decorative Surface

An 80 g/m² porous paper used for decor printing was impregnated with an aqueous solution containing 60 wt % of melamine-formaldehyde based resin and dried before inkjet printing to a residual humidity of about 8 g/m².

A decorative layer was obtained by printing a decorative pattern on the melamine-formaldehyde based resin impregnated paper using ink from the CRYK inkjet ink set in Table 7 and a KJ4B Kyocera print head at a head temperature of 32° C. at 600 dpi. The dry weight of the jetted ink was less than 1 g/m².

An assembly was made as shown in FIG. 3, wherein the prepared decorative layer was interposed between a HDF core and protective layer of unprinted melamine-formaldehyde resin impregnated paper containing aluminium oxide for durability. The assembly was then heat pressed into a laminate by a DPL process using 138 bar and 50 kg/cm². Two combinations of temperature and time A and B as shown in Table 15 were used for melting the thermosetting resin and melding the layers together.

TABLE 13

| T/t -Condition | Temperature T | Time t |
|---|---|---|
| A | 140° C. | 90 sec |
| B | 195° C. | [0020] c |

Evaluation and Results

The resulting floor laminates were examined for adhesion, bleeding and blister formation. The results are given in Table 15.

TABLE 14

| T/t -Condition | Adhesion | Bleeding | Blisters |
|---|---|---|---|
| A | 1 | 3 | 0 |
| B | 1 | 2 | 0 |

The floor laminates exhibited good adhesion and no blisters, while the amount of bleeding decreased with increasing temperature and time and the image quality was found sufficient for low-end laminate flooring.

The image quality and bleeding of the decorative pattern on the melamine-formaldehyde based resin impregnated paper was compared with the same decorative pattern printed on a non-impregnated paper. The colour pattern on a paper not impregnated by the melamine-formaldehyde based resin exhibited unacceptable image quality, due to low optical density and excessive bleeding. It was found that the application of a typical inkjet receiver coating on the paper not impregnated by melamine-formaldehyde based resin improved the image quality, but resulted also in an inhomogeneous and slower thermosetting resin pick-up afterwards leading to inferior adhesion.

Example 3

This example illustrates the advantageous effects on image quality by the addition of a polymer latex binder to the aqueous inkjet inks, as required by the present invention, while maintaining good results on adhesion and blister formation.

Preparation of Inkjet Inks

A first aqueous inkjet ink set S1 was prepared by using the same concentrated pigment dispersions of Example 1 and mixing the components according to Table 16.

TABLE 15

| Component (in wt %) in S1 | C | R | Y | K |
|---|---|---|---|---|
| PB15:3-concentrated dispersion | 20.0 | — | — | — |
| PR254-concentrated dispersion | — | 20.0 | — | — |
| PY151-concentrated dispersion | — | — | 20.0 | — |
| PBL7-concentrated dispersion | — | — | — | 20.0 |
| Capstone ™ FS3100 | 0.7 | 0.7 | 0.7 | 0.7 |
| Emuldur ™ 381A | 30.0 | 30.0 | 30.0 | 30.0 |
| Water | 29.3 | 29.3 | 29.3 | 29.3 |
| 2-Pyrrolidone | 20.0 | 20.0 | 20.0 | 20.0 |
| Viscosity (mPa · s) at 32° C. | 3.4 | 3.9 | 4.3 | 5.3 |
| Surface Tension (mN/m) | 20.7 | 20.3 | 19.5 | 19.3 |

A second aqueous inkjet ink set S2 was prepared by mixing the components according to Table 17.

TABLE 16

| Component (in wt %) in S2 | C | R | Y | K |
|---|---|---|---|---|
| Cab-O-jet ™ 450C | 20.0 | — | — | — |
| Cab-O-jet ™ 465M | — | 20.0 | — | — |
| Cab-O-jet ™ 470Y | — | — | 20.0 | — |
| Cab-O-jet ™ 300 | — | — | — | 20.0 |
| Capstone ™ FS3100 | 0.7 | 0.7 | 0.7 | 0.7 |
| Emuldur ™ 381A | 30.0 | 30.0 | 30.0 | 30.0 |
| Water | 29.3 | 29.3 | 29.3 | 29.3 |
| 2-Pyrrolidone | 20.0 | 20.0 | 20.0 | 20.0 |
| Viscosity (mPa · s) at 32° C. | 2.9 | 3.1 | 3.0 | 3.4 |
| Surface Tension (mN/m) | 19.0 | 19.3 | 18.7 | 19.1 |

A third aqueous inkjet ink set S3 was prepared by mixing the components according to Table 18.

TABLE 17

| Component (in wt %) in S3 | C | R | Y | K |
|---|---|---|---|---|
| D75C (C.I. Pigment Blue 15:3) | 20.0 | — | — | — |
| D71M (C.I. Pigment Red 122) | — | 20.0 | — | — |
| D75Y (C.I. Pigment Yellow 74) | — | — | 20.0 | — |
| D73K (Carbon Black) | — | — | — | 20.0 |
| Capstone ™ FS3100 | 0.7 | 0.7 | 0.7 | 0.7 |
| Emuldur ™ 381A | 30.0 | 30.0 | 30.0 | 30.0 |
| Water | 29.3 | 29.3 | 29.3 | 29.3 |
| 2-Pyrrolidone | 20.0 | 20.0 | 20.0 | 20.0 |
| Viscosity (mPa · s) at 32° C. | 3.3 | 4.9 | 3.4 | 4.5 |
| Surface Tension (mN/m) | 20.2 | 19.6 | 19.1 | 20.5 |

The same method for making a decorative surface as described above in Example 2 was used, except that the assembly according to FIG. 3 was now heat pressed into a laminate by a DPL process using 138 bar and 50 kg/cm² for 30 seconds at 180° C. A colour pattern of each individual inkjet ink was printed and evaluated.

Evaluation and Results

The resulting floor laminates evaluated for adhesion, bleeding and blister formation are given in Table 19.

TABLE 18

| Ink set | Inkjet ink | Adhesion | Bleeding | Blisters |
|---|---|---|---|---|
| S1 | C | 1 | 2 | 0 |
|  | R | 1 | 1 | 0 |
|  | Y | 1 | 1 | 0 |
|  | K | 1 | 1 | 0 |
| S2 | C | 1 | 1 | 0 |
|  | R | 1 | 0 | 0 |
|  | Y | 1 | 0 | 0 |
|  | K | 1 | 1 | 0 |
| S3 | C | 1 | 2 | 0 |
|  | R | 1 | 0 | 0 |
|  | Y | 1 | 2 | 0 |
|  | K | 1 | 0 | 0 |

The image quality was much better than in Example 2. No or minor bleeding was observed due to the inclusion of a latex in the inkjet ink. The inclusion of a latex can be seen as an in-situ formed ink-receiving layer, but not exhibiting barrier-layer properties.

REFERENCE SIGNS LIST

TABLE 19

11 Paper manufacturer
12 Paper roll

TABLE 19-continued

13 Decor printer
14 Gravure printing
15 Inkjet printing
16 Decor Paper roll
17 Warehouse
18 Impregnation
19 Cutting to size
20 Floor laminate manufacturer
21 Floor laminate
30 Decorative panel
31 Core layer
32 Groove
33 Tongue
34 Decorative layer
35 Protective layer
36 Balancing layer
37 Relief

The invention claimed is:

1. A method for manufacturing decorative surfaces, the method comprising the steps of:
    impregnating a paper substrate with a thermosetting resin;
    inkjet printing a color pattern with one or more aqueous inkjet inks containing a polyurethane based latex binder on the thermosetting resin impregnated paper substrate to define a decorative layer (34); and
    heat pressing the decorative layer (34) between:
    a) a core layer (31) and
    b) a protective layer (35) including a second thermosetting resin impregnated paper into a decorative surface;
    wherein
    the color pattern contacts the protective layer (35);
    the thermosetting resin of the decorative layer (34) and the thermosetting resin of the protective layer (35) is a melamine based resin;
    the color pattern includes less than 6 g/m² ink dry weight; and
    the one or more aqueous inkjet inks define an aqueous inkjet ink set consisting of a cyan aqueous inkjet ink, a red aqueous inkjet ink, a yellow aqueous inkjet ink, and a black aqueous inkjet ink,
    wherein the red aqueous inkjet ink includes a color pigment selected from the group consisting of C.I. Pigment Red 254 and mixed crystals thereof.

2. The method according to claim 1, wherein the protective layer includes particles in an amount between 1 g/m² and 100 g/m², and the particles are ceramic particles or mineral particles selected from the group consisting of aluminum oxide, silicon carbide, silicon oxide, silicon nitride, tungsten carbide, boron carbide, and titanium dioxide, or any other metal oxide, metal carbide, metal nitride, or metal carbonitride.

3. The method according to claim 1, wherein the protective layer is embossed with a relief corresponding to the color pattern.

4. The method according to claim 1, wherein the thermosetting resin impregnated paper substrate of the decorative layer is colored.

5. The method according to claim 1, wherein the yellow aqueous inkjet ink includes a color pigment selected from the group consisting of C.I. Pigment Yellow 151, C.I. Pigment Yellow 74, and mixed crystals thereof.

6. The method according to claim 1, wherein
    the cyan aqueous inkjet ink includes a copper phthalocyanine pigment;
    the yellow aqueous inkjet ink includes a color pigment selected from the group consisting of C.I. Pigment Yellow 151, C.I. Pigment Yellow 74, and mixed crystals thereof; and
    the black aqueous inkjet ink includes a carbon black pigment.

7. A decorative panel obtained by the method according to claim 1, wherein the decorative panel is selected from the group consisting of flooring, kitchen, furniture, and wall panels.

8. The decorative panel according to claim 7, wherein the decorative panel includes a tongue and a groove mechanical joint that requires no glue.

* * * * *